United States Patent Office 3,433,492
Patented Mar. 18, 1969

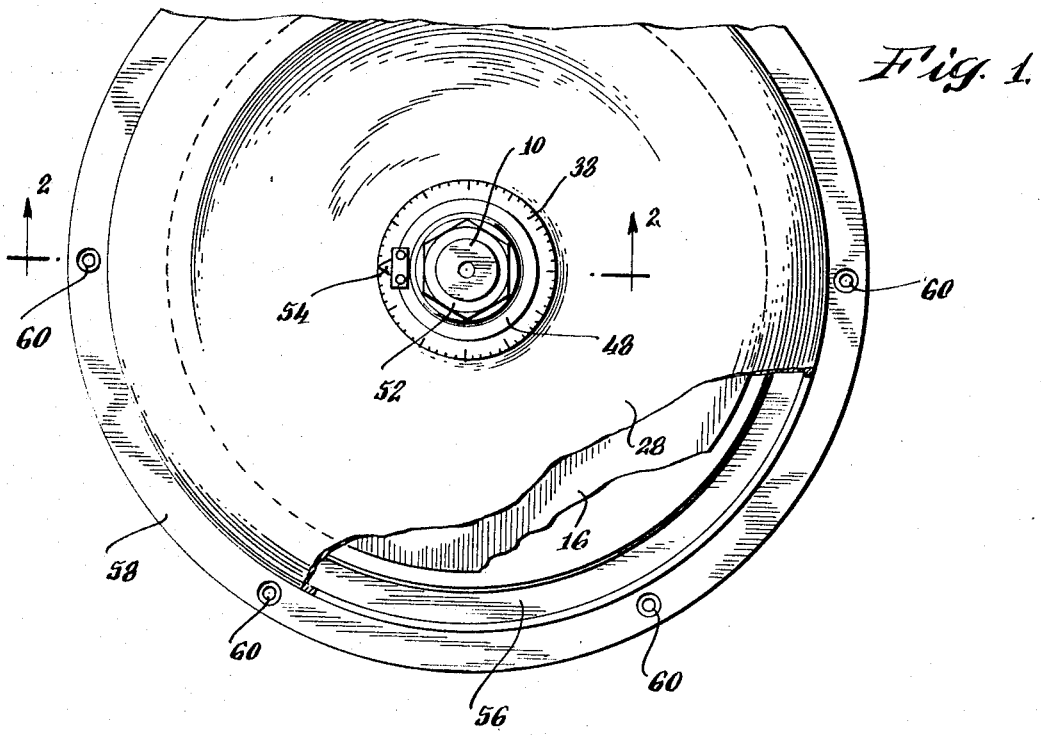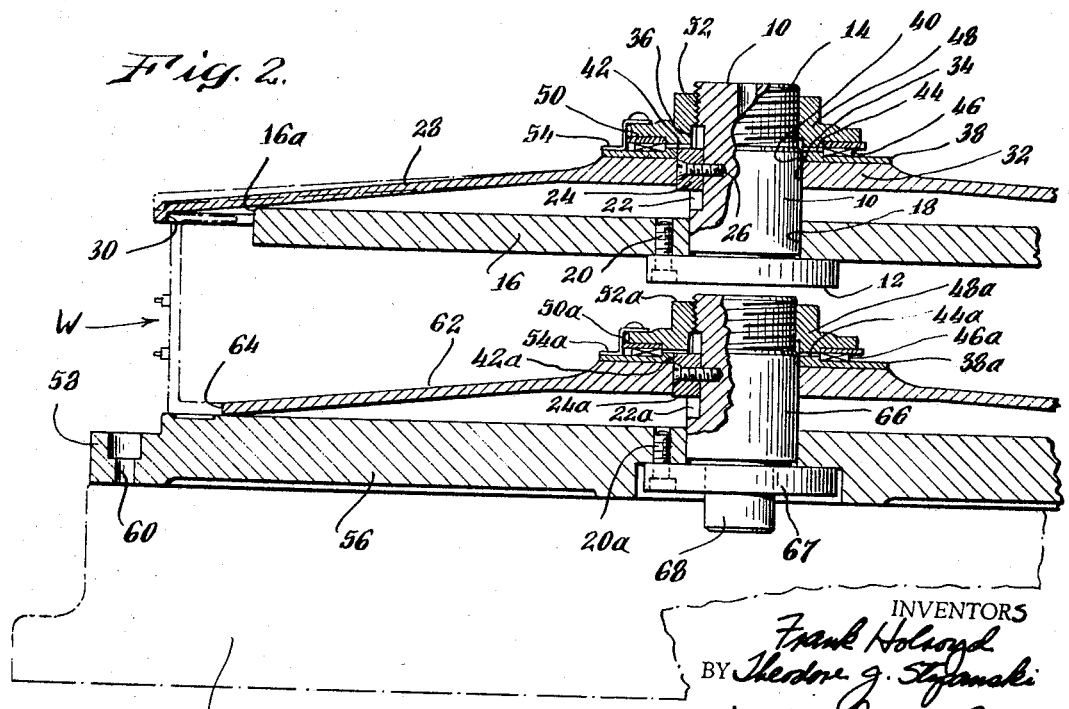

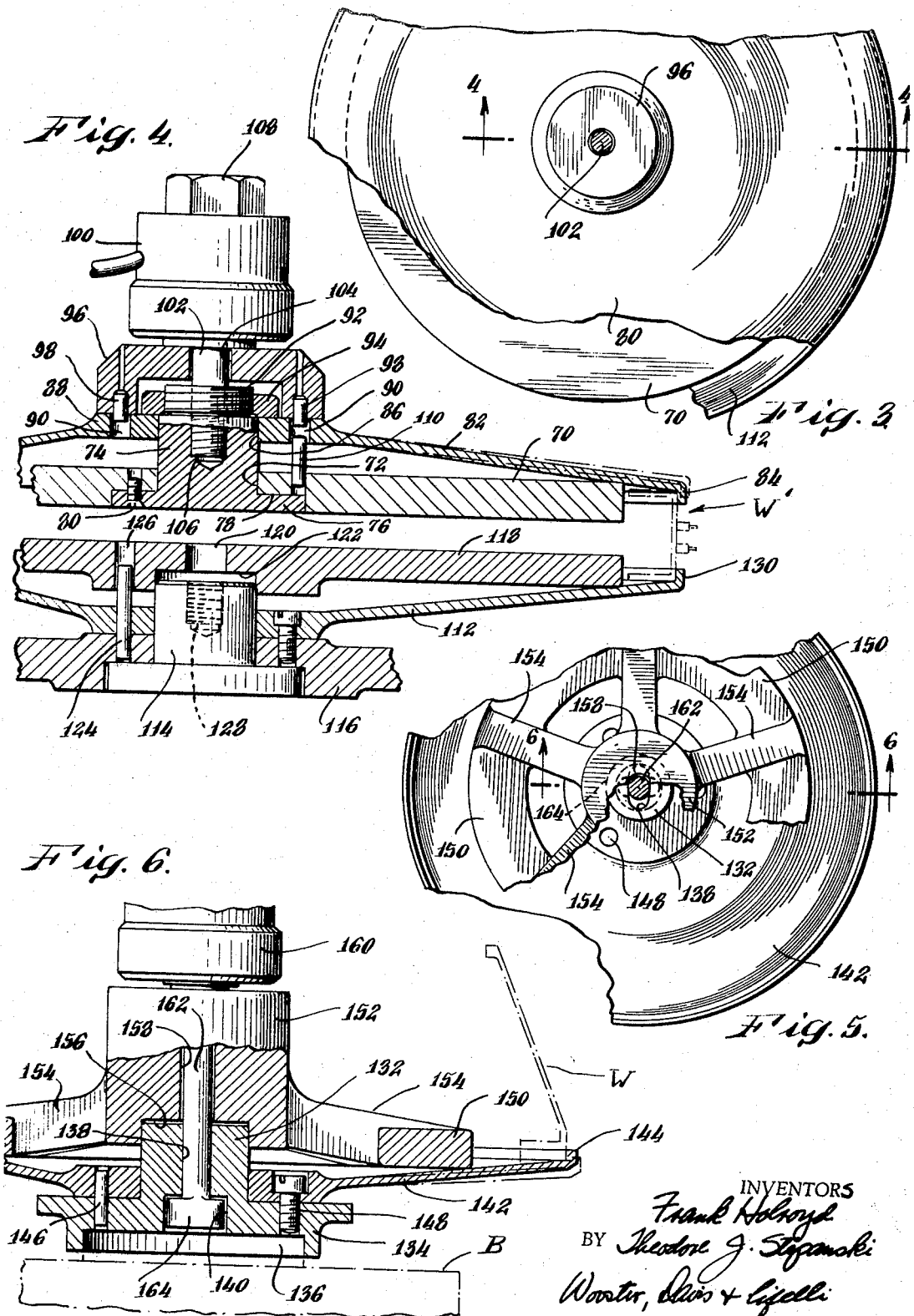

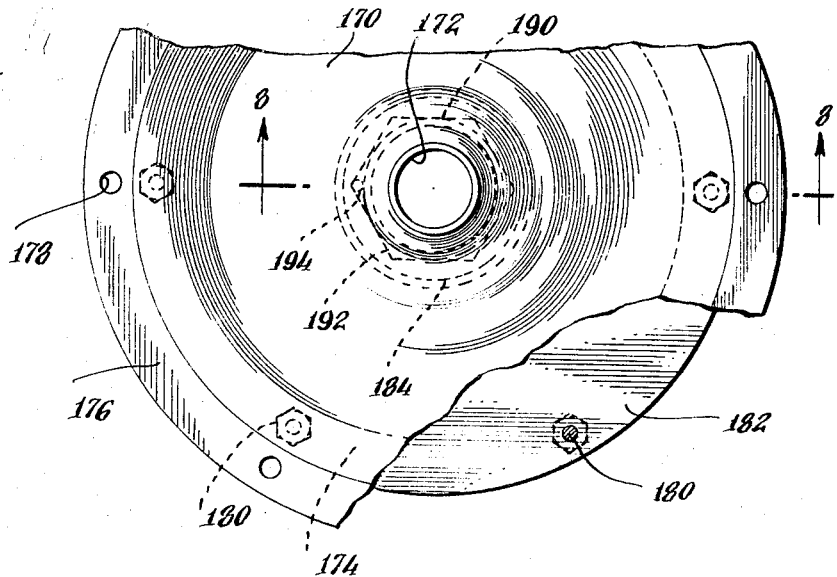
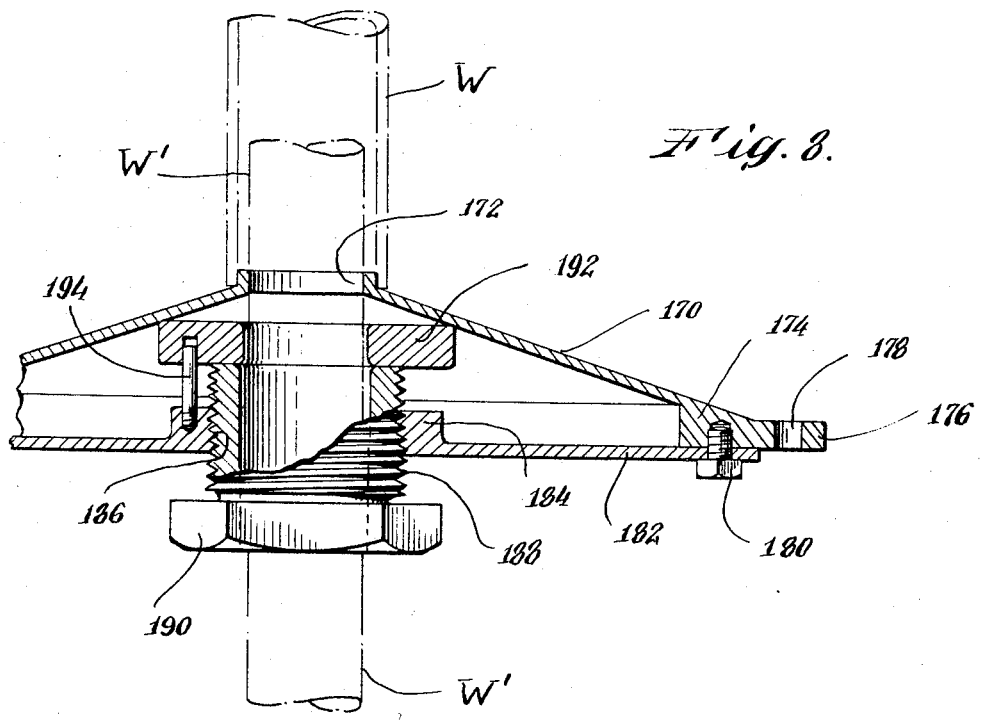

3,433,492
CHUCK
Frank Edward Holroyd, R.F.D. 1, Sandy Hook, Conn. 06482, and Theodore J. Stepanski, 42 Otis St., Manchester, Conn. 06040
Filed Feb. 24, 1966, Ser. No. 529,724
U.S. Cl. 279—2
Int. Cl. B23b 31/40
7 Claims

ABSTRACT OF THE DISCLOSURE

A work-holding chuck of particular value in holding a round workpiece of thin gauge material where concentricity is important. The chuck is in the form of a resilient metal cone having a large diameter end defining a continuous work-holding edge. A reaction member causes the cone to stretch to increase the diameter of the work-holding edge.

---

This invention relates to a chuck and, more particularly, to a chuck of broader utility than those known to the prior art.

In many manufacturing and machining operations it is required that a round workpiece be gripped about its periphery in such a manner that concentricity be achieved and maintained. This is particularly true where the workpiece is of relatively "flimsy" construction—being made, for example, of thin gauge material.

As an example of the difficulties experienced in the prior art, it is often required to determine the concentricity of a tube or cylinder of thin gauge metal. The first step in such an undertaking has been to calculate the average diameter of each end of the tube. This requires the taking of many diameter measurements at each end. These measurements are then averaged. A solid ring is then selected for each end which has a diameter approximately equal to the calculated average diameter and these rings are positioned on the workpiece. The workpiece is then placed upon a rotating table and the rings are checked against one another to determine the concentricity. It would, of course, be desirable to eliminate many of these steps and simplify the measurement of concentricity.

Allied with the problem of determining concentricity is the difficulty of securing proper alignment for performing machining operations. It is often required that holes be drilled or other machining operations be carried out with a high degree of precision on parts which are difficult to keep in round due to their natural flexibility.

It is often difficult to employ prior art chucks in the balancing of a workpiece. Balancing is normally accomplished by mounting the workpiece on a rotating table. The table and workpiece are then rotated and the axial movement of the table is measured as an indication of the unbalance. This creates problems when the workpiece is of a light weight nature. This is because the chuck which is employed to hold the workpiece to the rotating table may weigh more than the workpiece itself. This substantially decreases the sensitivity of the balance measurement.

Although a number of efforts have been made to produce a chuck which overcomes the above disadvantages, none of the prior art devices have been completely satisfactory. One approach, for example, has been to provide a chuck having a plurality of circularly positioned gripping jaws for engaging the periphery of a circular workpiece. Such a device is, of course, relatively complex and requires a number of parts. Of more importance, however, is the fact that it cannot grip a thin gauge hollow workpiece without creating distortions. For example, such a workpiece would be slightly indented at each jaw position and would tend to bulge between the jaw members. The difficulty of checking concentricity or performing accurate machining operations under such conditions will be evident.

Accordingly, it is the primary object of this invention to provide an improved chuck. Other objects are to provide such a chuck which is of simplified and inexpensive construction; to provide such a chuck which is capable of gripping a circular workpiece; to provide such a chuck which is capable of rounding the workpiece; and to provide such a chuck wherein many of the heavier elements of the chuck may be removed while retaining its gripping capabilities.

The manner in which the foregoing objects are achieved will be more apparent from the following description, the appended claims and the figures of the attached drawing wherein:

FIG. 1 is a plan view of a pair of chucks constructed in accordance with this invention;

FIG. 2 is an enlarged cross section taken substantially along the line 2—2 of FIG. 1;

FIG. 3 is a plan view of a pair of modified chucks in accordance with this invention;

FIG. 4 is an enlarged cross section taken substantially along the line 4—4 of FIG. 3;

FIG. 5 is a plan view of another modification of the chuck of this invention;

FIG. 6 is an enlarged cross section taken substantially along the line 6—6 of FIG. 5;

FIG. 7 is a plan view of still another modification of the chuck of this invention; and FIG. 8 is an enlarged cross section taken substantially along the line 8—8 of FIG. 7.

In accordance with the present invention, there is provided a work-holding chuck which comprises a resilient conical gripping member defining a circular work-holding edge. A reaction member is positioned for axial movement against the conical member. Compression means is provided for forcing the reaction member against the conical member, thereby expanding the conical member to increase the diameter of its work-holding edge.

FIGS. 1 and 2 illustrate two variations of the chuck of this invention shown cooperatively engaged to secure a workpiece W to a rotary table T for making concentricity measurements. The chucks illustrated in FIGS. 1 and 2 differ in that the lower chuck, as seen in FIG. 2, is designed to engage the internal surface of the workpiece, while the upper chuck is arranged to engage the external periphery of the workpiece.

The uppermost chuck comprises a central hub 10 having an outwardly extending circular flange 12 on its lower end. The upper end 14 of the hub is externally threaded. A reaction disc 16 defines a circular opening 18 which surrounds the hub 10. The reaction disc is fixedly secured to the flange 12 by means of screws 20. The hub 10 defines a vertical keyway 22 on its exterior surface. A key 24 is mounted in this keyway by means of a screw 26. It will now be apparent that the hub 10, flange 12, reaction disc 16, and key 24 form a unitary assembly. This assembly may be considered the actuating portion of the upper chuck. The gripping portion of the chuck comprises a conical member 28 which is formed of a resilient material such as steel and is positioned over the reaction disc 16. The outer circumference of the conical member 28 carries a downwardly projecting flange 30 which serves to grip the outer periphery of workpiece W. The conical member 28 is truncated and includes a thickened substantially non-resilient central portion 32 which is slidable on the hub 10. For this purpose, central portion 32 defines a central opening 34 and a keyway 36 for engaging key 24. Positioned against the flat upper surface of the central portion 32 is a disc 38 having a circular scale engraved on its upper surface, as shown in FIG. 1. The disc 38 includes a central opening 40 and a keyway 42 aligned with the opening and keyway of conical member 28. It will thus be seen that the conical member and the graduated disc are vertically slidable on the hub 10 but are non-rotatable with respect to the hub. The graduated disc 38 is formed with a slightly raised internal flange 44 and an annular thrust bearing 46 encircles this flange. An adjusting nut 48 is threaded onto the upper end 14 of the hub 10 and its lower surface defines a recess which retains a washer 50 arranged to bear against the thrust bearing 46. The upper end of the adjusting nut 48 includes a hexagonal head 52 for engagement with a standard wrench and the adjusting nut further carries an indexing pointer 54 positioned adjacent the scale of the graduated disc 38.

As has been previously explained, the upper chuck shown in FIGS. 1 and 2 is designed to grip the external periphery of a circular workpiece. This is accomplished by turning the adjusting nut 48 so as to screw it downwardly on hub 10. This forces the central portion 32 of conical member 28 downwardly along the hub and causes the circular edge 16a of reaction disc 16 to move upward relative to the conical member 28. Conical member 28 is thereby stretched and the gripping flange 30 is expanded in a radially outward direction as indicated by the broken lines. The amount of the expansion may be governed by the degree of rotation of adjusting nut 48, as indicated by pointer 54 and graduated disc 38. When the circular opening defined by the clamping flange 30 is sufficient to clear the workpiece, it is positioned on the workpiece and the adjusting nut 48 backed off. The normal resiliency of conical member 28 causes it to tend to return to its original position, thus clamping the workpiece W within the circular clamping flange 30. Since conical member 28 has an unbroken periphery, the workpiece is gripped around its entire circumference, rounding and centering it relative to the conical member.

In the lowermost chuck of FIGS. 1 and 2 there is provided, in place of the relatively small diameter reaction disc of the upper chuck, a large diameter circular base 56. Base 56 includes an outer mounting flange 58, which includes screw holes 60 by means of which the base may be mounted against a rotating table T. The conical member 62 of the lower chuck differs slightly from that of the upper chuck in that its outer edge serves to grip the inner edge of the workpiece W so that no gripping flange is required. This outer edge 64 bears directly against the upper surface of the base 56. The central hub 66 of the lower chuck will also be seen to be slightly different in that its flange 67 is recessed into base 56 and it is provided with a downwardly extending stud 68 for engaging an alignment opening in the rotating table T. With these exceptions, the parts of the lower chuck are similar to those of the upper chuck and are accordingly given similar reference numerals with the subscript a attached.

It will now be seen that, in order to employ the lower chuck, the workpiece W is first placed on the upper surface of base 56 surrounding the outer edge 64 of conical member 62. The adjusting nut 48a is then tightened, forcing the conical member 62 downward and causing it to expand until the outer edge 64 firmly engages the workpiece. The upper chuck is then engaged in the manner previously described.

FIGS. 3 and 4 illustrate a pair of modified chucks clamping a workpiece W' therebetween. The chucks in these figures are similar to the upper chuck of FIGS. 1 and 2 but are operated by hydraulic pressure, rather than by an adjusting nut. In addition, these figures illustrate a removable feature of the hydraulic actuating mechanism. Referring particularly to FIG. 4, there is illustrated an upper chuck including a reaction disc 70 having a central opening 72 within which is positioned an actuating hub 74. The lower end of the actuating hub 74 terminates in a radially extending flange 76 positioned in a recess 78 of reaction disc 70. The hub is secured to the reaction disc 70 by means of screws 80 which extend through the flange 76 into the reaction disc. A conical member 82 having a gripping flange 84 around its large diameter edge is positioned over the reaction disc and actuating hub by means of an opening 86 in its central thickened portion 88. Central portion 88 also defines a plurality of spaced vertical positioning holes 90 therethrough. The upper end of the actuating hub 74 carries a threaded portion 92 which is engaged by a nut 94 which serves to limit the vertical motion of the hub and reaction disc 70 relative to the conical member 82. A cap 96 is mounted on the central portion 88 of the conical member by means of positioning pins 98 which extend into the guideways 90. The cap supports a hydraulic cylinder 100 which is a standard commercial item. A movable piston rod 102 extends from hydraulic cylinder 100 through a central opening 104 in cap 96 and its lower end is threaded into a bore 106 in actuating hub 74. The upper end of the piston rod 102 is secured by a nut 108. A guide pin 110 extends upwardly from the reaction disc 70 into one of the positioning holes 90 which functions as a guideway. It will now be apparent that when hydraulic pressure is applied to cylinder 100 a squeezing action takes place as piston rod 102 is pulled upward into the cylinder. This also forces the actuating hub 74 upward and raises the reaction disc 70 against the conical member 82. The conical member is thus expanded to the position illustrated by the broken lines, as in the previously described embodiments. The gripping flange 84 may then be placed over the workpiece W' and the hydraulic pressure released. The normal resiliency of the gripping member 82 then causes the flange to engage the outer periphery of the workpiece.

The lower chuck is similar in most important respects to the upper chuck but is shown with the hydraulic cylinder removed. In this arrangement the conical member 112 and the actuating hub 114 are both secured to a base 116. The reaction disc 118 includes a central opening 120 and a recess 122 which fits slidably over the end of the actuating hub 114. A guide pin 124 extends upwardly from the assembly of the base 116 and the conical member 112 into a guideway 126 in the reaction disc. The actuating hub 114 includes a threaded bore 128 which extends downwardly from its upper surface. In order to expand the lower chuck, the hydraulic cylinder is positioned on the reaction disc 118 with its piston rod extending through the opening 120 and threadedly engaging the bore 128 of the actuating hub 114. Pressure applied to the hydraulic cylinder thus forces the reaction disc 118 downwardly along the actuating hub and against the conical member 112, extending it as previously explained. The conical member 112 is then released to engage the workpiece W' by its gripping flange 130. The hydraulic cylinder is then removed and the piston rod disengaged by unscrewing it from bore 128.

A further modification of the chuck of this invention is illustrated in FIGS. 5 and 6. In this embodiment the actuating hub 132 is shown as positioned on a balancing table B. The hub is substantially cylindrical and includes a base flange 134 which may be centered on the balancing table B by means of a recess 136. Extending vertically downward from the upper surface of the actuating hub is a passage 138 having an oval cross section, the long axis of the oval being perpendicular to the plane of the drawing. The lower end of the passage 138 terminates in a circular locking recess 140. Mounted around the cylindrical portion of the actuating hub 132 is the conical member 142, having a peripheral gripping flange 144. The conical member is positioned on the actuating hub by means of positioning pin 146 and secured by means of screws 148.

In place of the reaction disc previously described, there is employed in this embodiment a wheel-like member including a circular rim 150 joined to a raised central reaction hub 152 by means of radial spokes 154. The reaction hub 152 includes a recess 156 which is slidably positioned over the upper end of actuating hub 132 and a circular bore 158 which extends downwardly from its upper end into recess 156. A hydraulic cylinder 160 of commercial manufacture, similar to those previously described, is mounted on the upper end of reaction hub 152. However, in this embodiment the piston rod 162 is somewhat longer than those previously described. It is also circular but at its lower end is provided with an oval head 164 having a minor diameter tangent to the diameter of the circular portion of the piston rod.

In utilizing the chuck of FIGS. 5 and 6, the actuating hub 132 and the conical member 142 are positioned on the balancing table B. The reaction hub 152 is then positioned over the actuating hub 132 as illustrated. The head 164 of the piston rod 162 is inserted into the oval passage 138, the head being aligned with the passage. After the head 164 has reached the locking recess 140, it is turned 90° to the illustrated position so as to lock the piston rod within the recess. The hydraulic cylinder 160 is then positioned over the piston rod and secured to it by conventional means. Actuation of the hydraulic cylinder forces the reaction hub 152 and the attached rim 150 downwardly against the conical member 142. The conical member 142 is thus caused to expand, as in the previous embodiments, and the workpiece is placed within the gripping flange 144. Upon release of the hydraulic pressure, the conical member 142 tends to return to its original position, causing the flange 144 to grip the workpiece. At this point, many of the heavier members of the chuck may be removed. The hydraulic cylinder 160 is first removed from the piston rod 162. The piston rod 162 is then rotated 90° so that its oval head 164 is aligned with the oval passage 138. Lifting the piston rod then removes both it and the reaction hub 152, thus removing the wheel-like member from the chuck. It will thus be seen that only relatively lightweight portions of the chuck remain and the workpiece is securely gripped for subsequent balancing operations.

In the embodiments described above; the central portion of the conical member is thickened and non-resilient, the outer edge being employed for gripping the workpiece. In FIGS. 7 and 8 there is illustrated a modification wherein the outer edge of the conical member is non-resilient and the workpiece is engaged by the edge defined by the truncated portion of the cone.

Referring to FIGS. 7 and 8, there is illustrated a conical member 170 terminating at its inner edge in a gripping flange 172 and at its outer edge in a thickened portion 174 surrounded by a mounting flange 176. Flange 176 includes spaced mounting holes 178 as required. Mounted against the thickened portion 174 by means of screws 180 is a plate 182. Plate 182 includes a central raised boss 184 which defines a threaded opening 186. An externally threaded bushing 188 having an adjusting head 190 is screwed into opening 186 and abuts against an annular reaction disc 192. Reaction disc 192 may be centered relative to the conical member by means of guide pins 194 or other suitable means.

It will now be apparent that bushing 188 may be threaded itno opening 186 causing disc 192 to bear against the inner surface of conical member 170, thus expanding the gripping flange 172 to bear against the inner surface of a tubular workpiece W. Alternatively, the gripping flange may first be expanded and then released to collapse onto the outer surface of a workpiece W'. For external gripping, the gripping flange 172 may be dispensed with, if desired. It will also be noted that, when gripping the exterior of a workpiece, the plate 182, bushing 188, and reaction disc 192 may all be removed from conical member 170.

It is believed that the many advantages of this invention will be apparent to those skilled in the art. It will also be apparent that many variations and modifications may be made in this invention wtihout departing from its spirit and scope. Accordingly, the foregoing description is to be construed as illustrative only, rather than limiting. This invention is limited only by the scope of the following claims.

What I claim as new and desire to secure by Letters Patent of the United States is:

1. A work-holding chuck which comprises: a relatively thin resilient metallic conical gripping member having a thickened, substantially non-resilient integral central portion; a substantially circular, continuous work-holding edge defined by the large diameter end of said gripping member; a substantially circular reaction member positioned for axial movement against the inner surface of the resilient portion of said conical member; and compression means for forcing said reaction member against said conical member to expand said conical member and thereby alter the diameter of said work-holding edge.

2. The chuck of claim 1 wherein said compression means comprises threaded means interconnecting said reaction member and conical member.

3. The chuck of claim 1 wherein said compression means comprises hydraulic actuating means.

4. The chuck of claim 1 wherein the large diameter end of said conical member includes a peripheral gripping flange engageable with a substantially circular workpiece.

5. The chuck of claim 1 wherein said conical member defines a first opening therein substantially concentric with said large diameter end; said reaction member defines a second opening aligned with said first opening; and said compression means extends through both of said first and second openings in selective compressive engagement with both of said conical member and reaction member.

6. The chuck of claim 5 wherein said reaction member comprises disc means having a circular outer edge in bearing relationship against the inner surface of said conical member.

7. The chuck of claim 6 wherein said conical member includes a peripheral gripping flange substantially integral with its large diameter end and engageable with a substantially circular workpiece.

References Cited

UNITED STATES PATENTS

| | | | |
|---|---|---|---|
| 2,681,229 | 6/1954 | Grobey | 279—102 |
| 2,747,880 | 5/1956 | Hohwart et al. | 279—4 |
| 2,380,509 | 7/1945 | Emerson | 279—2 X |
| 2,482,439 | 9/1949 | Smith | 279—2 X |
| 2,612,376 | 9/1952 | Wollner | 279—2 |
| 2,709,599 | 5/1955 | Mann | 279—4 |
| 2,788,979 | 4/1957 | Skillin | 279—4 |
| 2,686,681 | 8/1954 | Nyland. | |
| 2,853,306 | 9/1958 | Atherholt. | |

LESTER M. SWINGLE, *Primary Examiner.*

J. C. PETERS, *Assistant Examiner.*

U.S. Cl. X.R.

279—4, 102